April 6, 1943.  E. C. WEISGERBER  2,315,681
FILTER
Filed May 31, 1940  2 Sheets-Sheet 1
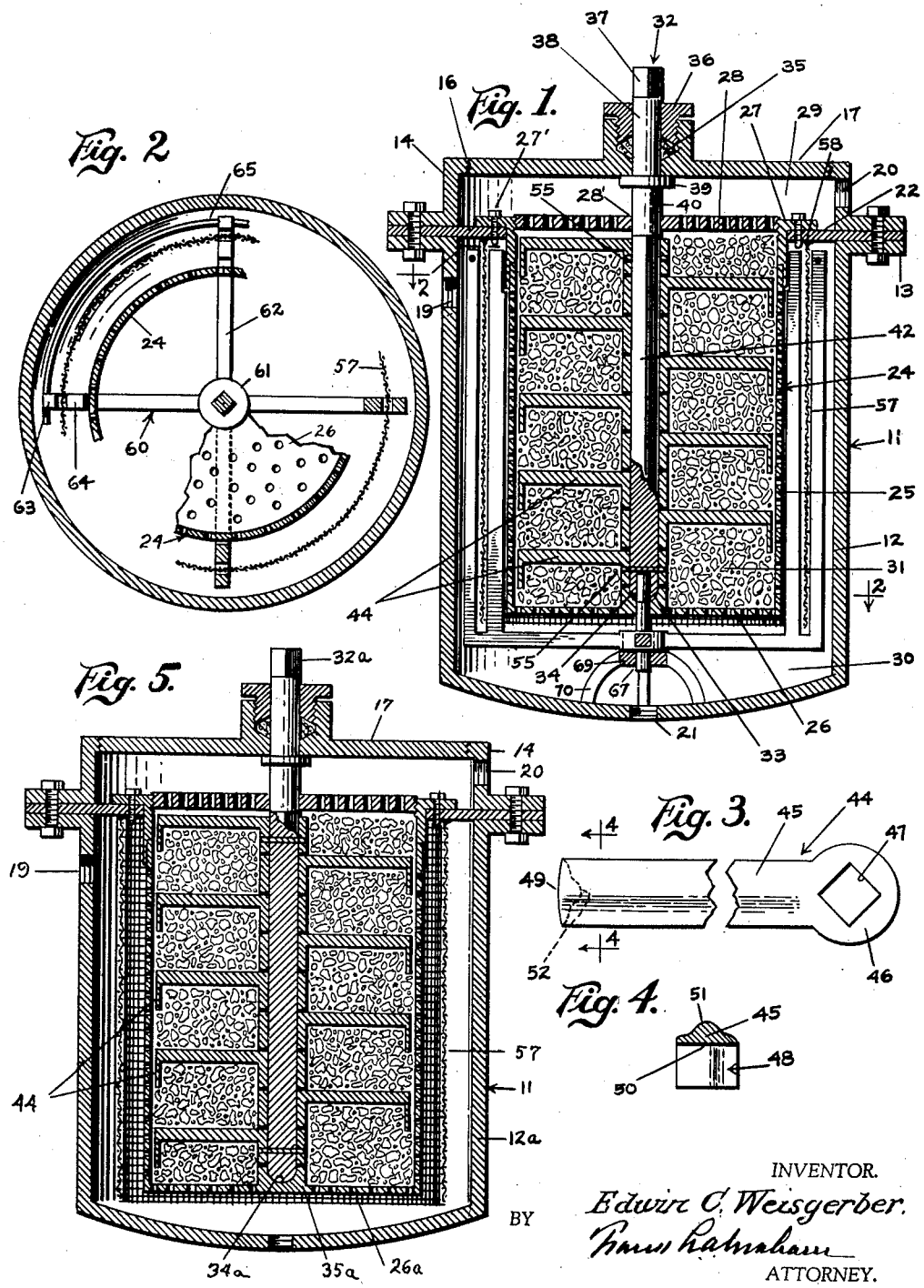
INVENTOR.
Edwin C. Weisgerber.
BY
ATTORNEY.

April 6, 1943. E. C. WEISGERBER 2,315,681
FILTER
Filed May 31, 1940 2 Sheets-Sheet 2

INVENTOR.
BY Edward C. Weisgerber
ATTORNEY.

Patented Apr. 6, 1943

2,315,681

UNITED STATES PATENT OFFICE 2,315,681

FILTER

Edwin C. Weisgerber, Los Angeles, Calif.

Application May 31, 1940, Serial No. 338,121

8 Claims. (Cl. 210—142)

This invention relates generally to filters.

Many types of filters have been devised for cleaning various fluids, including liquids, gases, air and vapors, the filters employing different filtering material depending upon the particular fluid to be filtered. So far as I am aware most filters soon become fouled and clogged with the dirt and impurities which are removed from the fluid passing through the filter with the result that the particular filter fails to efficiently perform its function and in addition so hinders the passage of the fluid that a high back pressure results in the inlet conduit.

It is also true that with the majority of filters the above mentioned difficulties occur when only a portion of the filter material has become fouled. It is usually the filter material which is first contacted by the fluid being filtered that becomes fouled while a great amount of filter material between the part initially contacted by the fluid and the outlet from the filter may remain in almost perfect condition.

Provision has been made in some filters for taking out the filter material which may be enclosed in a removable cartridge so that it may be washed and replaced. Other filters are provided with a replaceable filter material. The disadvantages of these two means of renewing the filter are that it takes considerable time to wash out the filter material and replace it and if this is done or if an entirely new refill cartridge of filter material be placed in the filter, only a small amount of the filter material has actually been utilized, for, as pointed out above, it is only a small portion of the filter material which actually becomes fouled while a greater proportion remains in good condition.

In view of the disadvantages of the various types of filters which have heretofore been used, it is a primary object of this invention to provide a new and improved filter in which means are provided for easily and quickly renewing the efficiency of the filter once it becomes impaired. It is also an object of this invention to provide means for renewing the efficiency of the filter without removal of the filter material. In this connection it is an object to provide means for utilizing to a maximum degree the entire body of the filter material.

It is a further object to provide a filter which does not cause a high back pressure to the fluid being filtered, and to provide means whereby the filter may be adjusted to decrease the resistance to flow of the fluid passing through the filter and thus decrease the resulting back pressure.

In order to accomplish the above objects it is an object of this invention to provide means whereby the filter material may be disturbed and shuffled from a point exterior of the filter at any time.

It is also an object of this invention to provide a filter construction which is adaptable for use with various types of filter materials at the will of the user and which includes means whereby the filter material may be easily and quickly removed and replaced by new filter material.

These and other objects will be apparent from the drawings and the following description thereof. Referring to the drawings—

Fig. 1 is a sectional elevation of a form of filter embodying the invention;

Fig. 2 is a sectional plan view on line 2—2 of Fig. 1, certain of the parts being only fragmentarily shown;

Fig. 3 is a plan view of a scraper arm;

Fig. 4 is a sectional elevation of a scraper arm on line 4—4 of Fig. 3;

Fig. 5 is a sectional elevation of a simplified form of the invention; and

Figure 6:
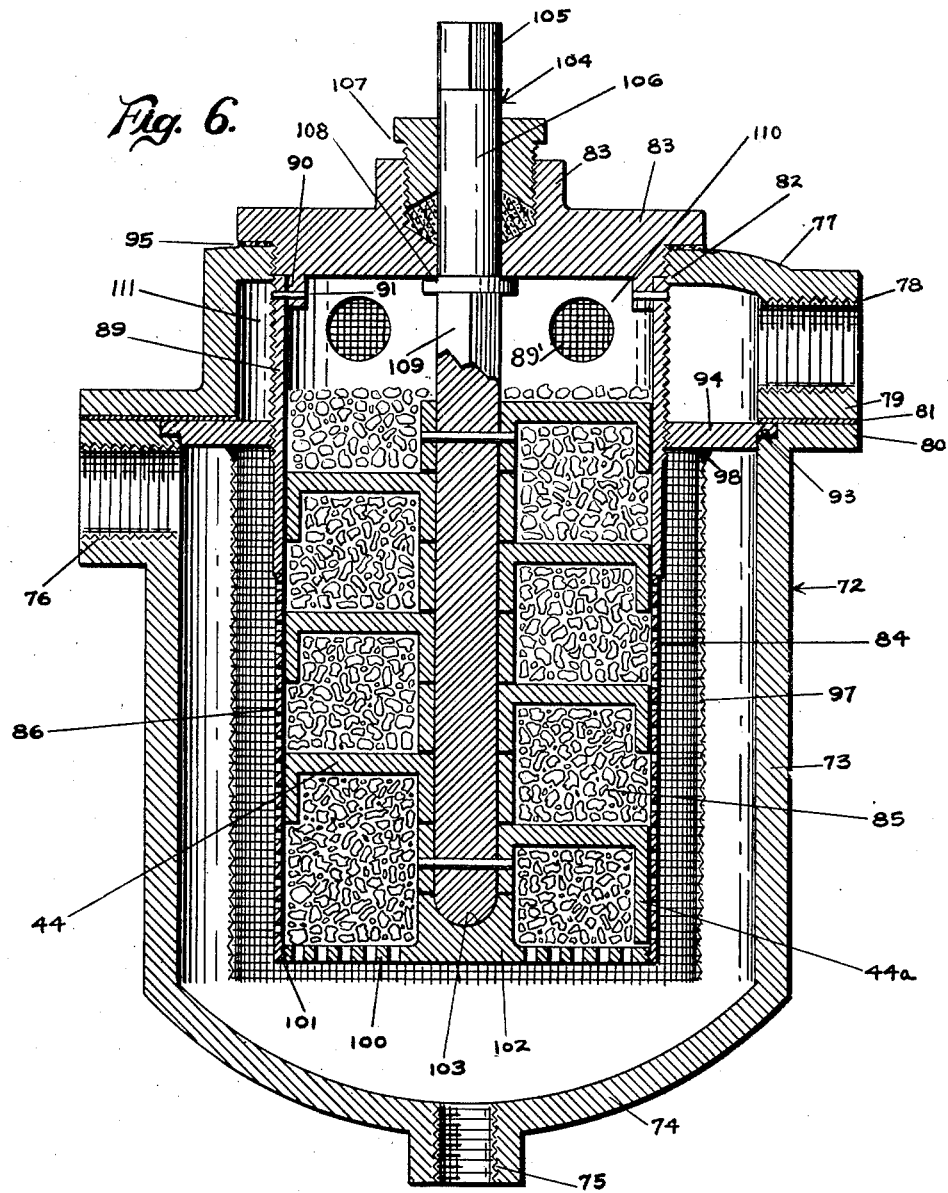
Fig. 6 is a sectional elevation of a filter embodying another form of the invention.

More particularly describing the invention, reference numeral 11 generally indicates a housing which is comprised of a cylindrical body 12 terminating at its upper end in a flange 13 to which is bolted a dome element 14. The dome is provided with internal screw threads 16 to accommodate a removable closure plate 17.

The housing is provided with inlet and outlet openings 19 and 20 respectively and with a drain opening 21. The lower end of the housing is dished as shown to facilitate drainage through the drain outlet 21.

Intermediate the flanged portion of the part 14 and the housing 11, is mounted an annular plate 22. This plate supports a perforate container or basket generally indicated by numeral 24. The container includes a cylindrical perforate side wall 25 and perforate lower end wall 26. At its upper end the wall 25 is mounted in a flanged ring 27 which is internally threaded to accommodate a perforate closure plate 28 for the upper end of the container. The container is removably mounted within the housing by means of bolts 27' extending through the ring 27 and plate 22.

The upper and lower ends of the container are spaced respectively from the ends of the housing 11 leaving a chamber 29 at the top on the outlet side of the filter and a chamber 30 at the bottom on the inlet side. Chamber 29 acts as a cushion for any sudden changes in pressure. The chamber 30 serves as a receptacle for dirt, sludge and the like, removed from the fluid between periodic draining of the filter.

For the purpose of renewing the efficiency of the filter material 31 contained within the perforate container 24, means are provided for shuffling or disturbing and changing the relative position of the components of the filter from a point externally of the filter. This means includes a rotatable shaft and scraper element on the shaft as will be described. A shaft 32 is provided which extends longitudinally of the container and is provided with a rounded lower end 33 adapted to be received in a bearing recess 34 of a boss 35 forming part of the member 26. The upper end of the shaft passes through an opening 28' in the plate 28 and through an apertured boss 25 on the plate 17. The boss is preferably provided with flat faces such as by being made hexagonal in shape so that a wrench may be applied to it to unscrew the plate 17 from the member 14. The boss 35 accommodates a packing gland 36 through which the shaft extends.

The shaft itself is provided with an upper portion 37 which is square in cross section so that it may be received in the jaws of a wrench or so that it can accommodate a crank for imparting rotation to the shaft. Immediately below this is a cylindrical portion 38 which extends through the packing gland and terminates in a flanged portion 39. Below the flanged portion 39 is another cylindrical portion 40 extending through the plate 38. Below portion 40 is a relatively long or major portion of the shaft 42 which is formed square in cross section for a purpose which will hereinafter become apparent.

Mounted on the shaft below portion 40 are a plurality of scraper arms 44. These arms each comprise an intermediate portion 45 (see Figs. 3 and 4) which terminates at one end in an apertured boss 46 having a square opening 47 so that the arm may be mounted on the shaft. The other end of the scraper arm terminates in a depending blade 48 which has an arcuate outer surface 49, which, when the arm is mounted on the shaft, is positioned closely adjacent the interior surface of the container. In the form of the invention shown the container has cylindrical walls and the blade is accordingly disposed at approximately right angles to the portion 45 of the scraper arm, however, it is apparent that the walls of the container might be frustro conical in shape, for example, in which case the blade would be disposed at a corresponding angle to the surface of the container.

The intermediate or major portion 45 of each scraper arm is provided with a flat under-surface 50 and a ribbed upper surface 51, resulting in an element having lateral margins of less thickness than the thickness of the central portion as clearly illustrated in Fig. 3. The inner surface of the blade 48 is also provided with a surface 52 which corresponds in shape to the surface 51. The scraper arm may also be described as having a longitudinally extending rib on its upper surface and on the inner surface of the blade, thereby resulting in the aforedescribed shape.

A plurality of arms 44 are successively arranged on the portion 42 of the shaft as shown in Fig. 1 in staggered relation. The upper and lower arms may be fastened to the shaft by means of pins 54 and 55 respectively. It is apparent that with this construction rotation of the shaft 32 will cause the scraper arms 44 to rotate within the perforate container 24 and serve to scrape the interior surface of the container. With the staggered relation of the arms, the blades cover practically the entire inner surface of the container except the end walls. During rotation the arms also serve to disturb and move the particles of filter material and shuffle them, thereby disarranging them from their former position and bringing unfouled filter particles to the region of the wall of the container. In this connection the particular cross sectional shape of the scraper arms and blades has been found particularly effective in causing a movement of the particles of the filter material so that the particles of filter material immediately adjacent the inner wall of the container are moved inwardly and fresh or unfouled particles move outwardly to take their place. The shaft may be rotated in either direction. The arrangement of the arms in staggered relation facilitates the movement or migration of the filter material particles. It is desirable in filling the container to leave some space between the top of the filter material and the top of the container and not pack the filter material in tightly, thereby leaving room for the material to move. It is apparent that with this construction it is possible to renew the efficiency of the filter by periodically rotating the shaft 32. It is also contemplated that for some installations it is desirable to provide means for continuously slowly rotating the shaft.

In the form of the invention shown in Figs. 1 and 2, a cylindrical screen 57 is provided exteriorly of the container 24 and dependently mounted from the plate 22 by means of brazing or welding 58. This screen is provided for the purpose of removing the relatively large particles of dirt or sludge from the fluid being filtered. Inasmuch as the screen may soon become clogged and gummed up, means have been provided for scraping this screen simultaneously with the shuffling of the filter material within the container. The means used to accomplish this include a scraper element 60 provided with a central boss 61 from which extend four radially disposed members 62 each of which terminates in two spaced longitudinally extending scraper elements 63 and 64 respectively. The outer scraper element 63 is positioned on the outside of the screen 57 while the innermost scraper element 64 is positioned intermediate the screen and the container. Although a plurality of members 63 are shown, only one such member is necessary and two such members are preferable in some installations. In order to prevent the outer scraper element 63 from becoming deflected and binding, these elements are held in spaced relation by a rod or heavy wire 65 connecting their upper ends.

The scraper structure 60 is keyed to a short shaft 67 which has a square upper end portion 68 received in a correspondingly shaped recess in the lower end of the shaft 32. The lower end of the shaft is rotatably received in the boss 69 of a spider support 70.

It is apparent that with this construction rotation of shaft 32 not only serves to rotate the scraper arms 44 but also rotates the scraper structure 60 thereby serving to scrape and clean the screen 57 and the outer surface of the container 24 dislodging particles and gummed material which can then fall to the bottom of the housing and be removed periodically through the drain opening 24.

With certain types of fluids to be filtered it is unnecessary to provide means for scraping and cleaning the screen 57 as where the fluids do not carry sufficiently large particles or gummy materials as would seriously clog this screen. Accordingly, in Fig. 5 there is shown a simplified form of the invention which is in many respects identical with that shown in Figs. 1 to 4 and heretofore described except that no scraping structure 60 is provided for cleaning the screen 57. The shaft, here indicated by 32a differs from shaft 32 in that it is provided with a solid end portion at its lower end. The plate 26a forming the lower end of the container is provided with a boss 35a having a recess 34a but not having an aperture therethrough as in the boss 35 of Fig. 1.

In Fig. 6 there is shown another form of the invention. Numeral 72 generally indicates a housing which is comprised of a substantially cylindrical body 73 having a dished lower end 74 terminating in a drain opening 75. The member 73 is provided with a threaded inlet 76. Adapted to be mounted on the body 73 is a dome 77 having an outlet 78. The members 73 and 77 are provided with the respective flanges 79 and 80 and interposed between these is an annular packing 81. The members may be secured together in any suitable manner as by bolts not shown. The dome is internally threaded at 82 to accommodate an end closure member 83. Integral with the enclosure 83 is a perforate container 84 which is adapted to hold any suitable filter material 31. The container is comprised of a cylindrical perforate wall 86 which terminates at its upper end in a threaded sleeve 89 which is secured to the enclosure 83 by means of pins 90 which extend through the sleeve and through lugs 91 on the under-surface of the member 83. The sleeve 89 is provided with a plurality of screened openings 89' providing communication from the interior of the container to the exterior thereof at a point above the plate 94 and to the outlet 81. The body 73 is provided with an annular seat 93 to accommodate an annular plate 94 which is internally threaded.

In this form of the invention the container 84 is mounted within the housing by means of the cooperating screw threads on the parts 83, 89, 77 and 94. Suitable packing 95 may be interposed between the members 83 and 77. With this construction the container is easily removable from the housing and in this connection to facilitate removal the boss 81' on the member 83 may be made hexagonal or any other suitable shape so that it may be easily grasped by the jaws of a wrench. Externally of the container there is provided a cylindrical screen 97 which is dependently mounted by means of welding or brazing 98 on the plate 94.

The lower end of the container 84 is provided with a removable perforate end closure member 100, the container wall 86 and member 100 being provided with cooperating screw threads 101 for this purpose. The closure 100 is provided with a boss 102 having a recess 103 for the reception of the lower end of a shaft 104. This shaft is provided at its upper end with a portion 105 which is square in cross section. Below this is a cylindrical portion 106 which is received in a packing gland 107 of the member 83 and below this portion is a flange 108. Extending from the flange to the lower end is a square portion 109 upon which are mounted a plurality of scraper arms 44. These scraper arms are the same as those previously described in connection with Figs. 1, 2 and 4 except that the lowermost scraper arm indicated by 44a is provided with a blade which is longer than the blades of the other scraper arms in order that the area of the container adjacent the bottom thereof may be scraped.

Preferably as heretofore described in connection with the other forms of the invention, the filter material is not packed tightly within the container but some space is left between the top of the container and the top of the filter material thereby permitting movement of the filter material when the shaft and scraper arms are rotated. With the construction of Fig. 6 there is provided a double chamber at the top of the filter which serves to cushion any sudden changes in pressure. This double chamber consists of an inner compartment 110 and an outer annular compartment 111. The lower end of the perforate container is spaced from the bottom of the housing in order to provide a collection chamber 112 for the reception of dirt, sludge and the like as my be removed from the fluid being filtered.

In all forms of the invention the perforate container is not provided with the perforations in the region immediately adjacent the upper side walls in order that the fluid being filtered will necessarily have to pass through a considerable body of the filter material before reaching the outlet. Thus, in Figs. 1 and 5 an imperforate ring 27 is provided at the outer end of the container while in Fig. 6 an imperforate sleeve 89 is provided at the upper end of the container.

Although the invention has been illustrated and described as taking particular forms, it is contemplated that various changes and modifications might be made without departing from the invention and it is intended to cover such changes as come within the scope of the claims.

I claim as my invention:

1. A filter comprising a housing having an inlet and an outlet; an annular plate mounted in said housing between said inlet and outlet; a cylindrical screen dependently mounted on said plate; a perforate container mounted on said plate and extending inside of said screen; filter material in said container; a shaft mounted for rotation in said container and extending to the exterior thereof and to the exterior of said housing; a plurality of arms mounted on said shaft for rotation therewith and embedded in said filter material; a scraper structure rotatably mounted in said housing and including a pair of longitudinally extending scraper elements arranged on opposite sides of said screen; and means operatively connecting said shaft and said scraper structure whereby rotation of said shaft rotates said arms and said scraper elements.

2. A device as defined in claim 1 in which the innermost of said scraper elements is positioned intermediate and closely adjacent said screen and container.

3. In a filter, a housing having an inlet opening and terminating at its upper end in an external flange; an annular plate mounted on said flange and extending inwardly of the wall of said housing; a dome closure element for said housing mounted on said plate and having an outlet opening; means securing the dome closure element, plate and housing together; a screen dependently mounted on said plate and extending in said housing in spaced relation with the inner wall thereof; a perforate container detachably mounted on said plate and extending therebelow into said housing inwardly of said screen; and filter material in said container; said dome including a removable section of sufficient size to permit removal of said container through the dome closure element.

4. In a filter, a perforate cylindrical container; filter material in said container; a shaft mounted for rotation in said container and extending to the exterior thereof; and a plurality of arms embedded in said filter material mounted on said shaft and extending radially therefrom in staggered relation and adapted to rotate with said shaft, said arms each having a flat under surface and a centrally ribbed upper surface and each terminating in a scraper blade disposed adjacent the inner surface of the container, said scraper blades each having a smooth arcuate outer surface and a centrally ribbed inner surface.

5. A scraper arm comprising a member having an elongate intermediate portion terminating at one end in a scraper blade and terminating at the other end in an apertured boss, said intermediate portion of the arm having a flat under surface and a centrally ribbed upper surface, said blade having a smooth arcuate outer surface and a centrally ribbed inner surface.

6. A filter comprising a housing having an inlet and an outlet; a perforate container mounted in said housing in spaced relation thereto positioned between said inlet and outlet; a cylindrical screen mounted in said housing between the inner wall of the housing and the outer wall of the perforate container; filter material in said container; a shaft mounted for rotation in said container and extending to the exterior thereof and to the exterior of said housing; a plurality of arms mounted on said shaft for rotation therewith and embedded in said filter material; a scraper structure rotatably mounted in said housing adapted to engage opposite sides of said screen; and means operatively connecting said shaft and said scraper structure whereby rotation of said shaft rotates said arms and said scraper elements.

7. In a filter, a housing having an inlet opening and terminating at its upper end in an external flange; a domed head closure mounted on said housing, said closure having an outlet opening, said closure having a central detachable section; a cylindrical perforate container suspended from the removable section of said closure and extending into said housing; an annular plate mounted in the region of the juncture of said housing and said closure and cooperating with said container to form an annular chamber above the plate in the closure exteriorly of the container and to separate the interior of the housing below said plate exteriorly of said container from the region above said plate; filter material in said container; said container having fluid escape passages in its upper portion providing communication to said annular chamber above said plate; and a cylindrical screen dependently mounted on said plate and surrounding the portion of said container below said plate in spaced relation to the container.

8. In a filter, a housing having an inlet opening and terminating at its upper end in an external flange; an annular plate mounted on said flange and extending inwardly of the wall of said housing; a dome closure element for said housing mounted on said plate and having an outlet opening; means securing the dome closure element, plate and housing together; a perforate container detachably mounted on said plate and extending therebelow into said housing; and filter material in said container; said dome including a removable section of sufficient size to permit removal of said container through the dome closure element.

EDWIN C. WEISGERBER.